Patented Aug. 9, 1932

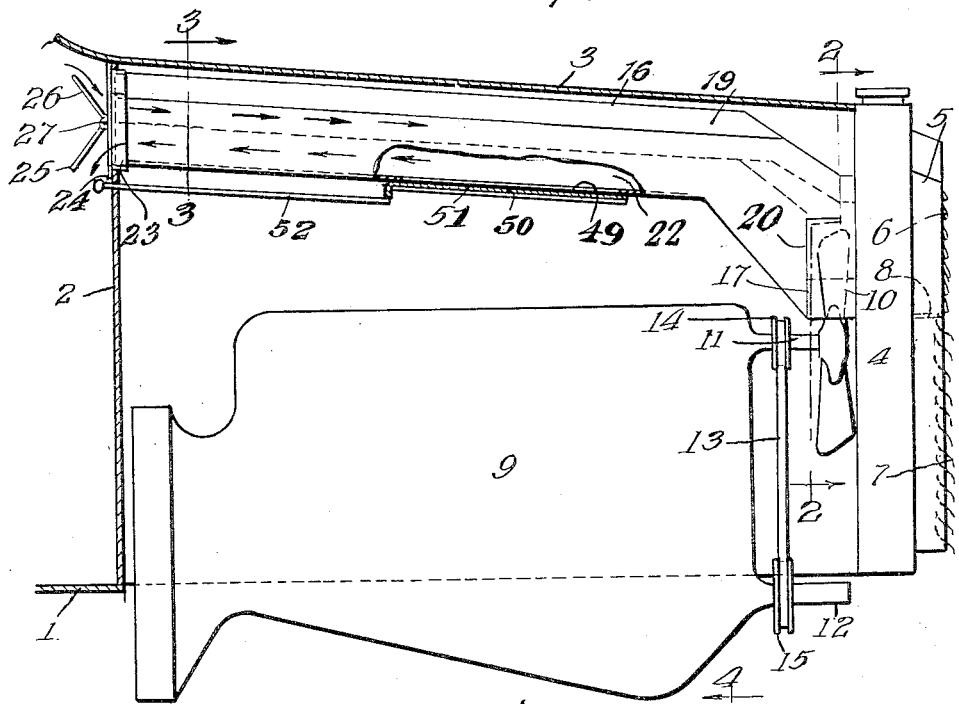
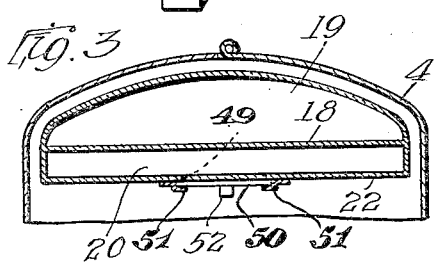
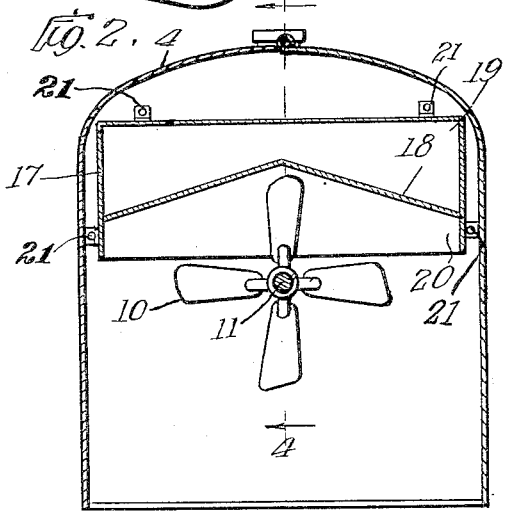
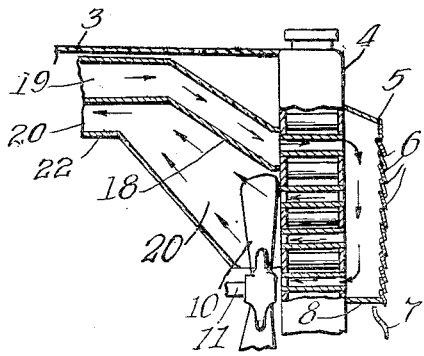

1,870,374

UNITED STATES PATENT OFFICE

EDWARD G. MIHALIAK, OF BROOKFIELD, ILLINOIS

AUTOMOBILE HEATER

Application filed February 10, 1928. Serial No. 253,356.

This invention relates to an automobile heater and more particularly to a heater for an automotive vehicle having a water or liquid cooled internal combustion engine for its source of power, a conventional form of radiator for cooling the engine cooling medium, and, usually, a fan for drawing air through the radiator for more effectively cooling the said cooling medium, as well as to blow relatively cool air about the engine to carry away the heat radiated thereby.

The main objects of the invention are to provide a novel and simple heater in which air, warmed by its passage through the radiator, will be forced into the body of the vehicle; to provide an arrangement for effecting circulation of air from the interior of the body of a closed vehicle, through the source of heat and back into the body; to provide an arrangement whereby the volume and temperature of warm air entering the body may be easily and effectively controlled and varied at will; to provide an arrangement in which the heat from the engine and exhaust pipe will serve to maintain the radiator-warmed air at its raised temperature or to additionally heat the air as it passes through the warm air conduit, from the radiator and into the vehicle body.

Another object of the invention is to provide an automobile heater which may be constructed as a unit, easily and quickly installed in an automobile between the radiator and the dash and with but little expense, and in general, it is the object of my invention to provide an improved heater of the class described.

With the above and other objects in view, the invention consists in certain novel combinations and arrangements of parts, as fully set forth in the following description particularly emphasizing and pointing out the same.

In the accompanying drawing:

Fig. 1 is a side elevation of the heater, showing the same in its operative relation to its associated vehicle parts, the latter being more or less diagrammatically illustrated.

Fig. 2 is a sectional view taken on the line 2—2 of Figure 1.

Fig. 3 is a sectional view taken on the line 3—3 of Figure 1.

Fig. 4 is a sectional view taken on the line 4—4 of Figure 2.

Referring to the drawing in detail and more particularly to Figures 1 to 4, inclusive, there is shown in broken lines, a portion of a car including the body 1 having the dash 2, hood 3, and the radiator 4, the latter being shown in full lines. In front of the radiator I provide a radiator front enclosure 5 having shutters, in the present instance comprising upper shutters 6 and lower shutters 7. The upper and lower sets of shutters are adapted to be independently or simultaneously operated manually or automatically but preferably the former, so as to facilitate controlling the temperature of the water in the radiator, and more particularly the temperature of the water in the upper portion of the radiator and thereby, at least in part, controlling the temperature to which the air is heated in its passage through the radiator. As shown, the front enclosure 5 is spaced forwardly from the front of the radiator so as to leave an air space or passageway between the enclosure and the radiator, and a partition 8 is provided for dividing the said space into upper and lower sections.

The engine in the car is designated at 9 and may be of the usual internal combustion type having a fan 10 mounted on the usual water circulating pump shaft or fan shaft 11 or otherwise and suitably driven from the crank shaft 12 or a shaft geared thereto, for instance, through the medium of an endless belt 13 trained around pulleys 14 and 15 on the respective shafts.

The heater unit comprises a casing 16 including an enlarged mouth part 20 which fits over and back of the fan 10, the upper part of the area of rotation of the fan being located within said mouth part, between the side walls 17 thereof and under a partition wall 18. The partition wall 18 divides the mouth part of the casing into upper and lower compartments as clearly shown in Figure 2. The front end of this mouth part is preferably attached directly to the back of the radiator in any suitable manner as by means of detachable fasteners 21 of any suitable kind.

The casing 16 extends rearwardly and upwardly at an angle from the mouth part 20 as shown in Figs. 1 and 4 and is continued in a rearwardly directed extension in the form of a more or less rectangular pipe having an arched top wall as shown in Fig. 3. Of course, the shape of the pipe or conduit may be varied at will to suit various requirements. The partition 18 is extended rearwardly in the pipe-like extension and serves to divide the same into two, upper and lower, conduits, respectively designated 19 and 22. By comparison of Figs. 2 and 3, it will be seen that the mouth partition of both the upper and lower conduits are enlarged in cross-sectional area relative to the corresponding areas of the respective conduits. The said double-conduit pipe is preferably located well over the engine and in parallel relation to the hood 3 as will be understood by inspection of Figs. 1 and 3, and the extension terminates at the dash 2. At the dash, the said extension is connected to a deflector unit which includes a collar 23 mounted in the dash 2. The conduit is thus operative to conduct hot air into the front part of the vehicle body.

The heater may be installed in one unit, being fastened at its front to the radiator, preferably detachably as shown and described, and in the rear to the deflector unit which may be slipped over the rear end of the pipe from the inside of the car and fastened to the dash as through the medium of the flange 24. At the rear end of the collar 23, shutters 25 and 26 are provided. These may be hinged as at 27 intermediate the upper and lower conduits so that they may be adjusted about the hinge pivot, to or from closed or open position as may be desired.

The operation of my improved heater structure is as follows: The fan 10 is operative to force air rearwardly into the mouth 20 of the lower conduit 22, through the said conduit 22 and into the interior of the body of the vehicle. The air which is so forced through the conduit 22 is heated by reason of having been drawn by the fan, through the upper part of the radiator, which is ordinarily the warmest part thereof. The mouth or compartment 20, being enlarged with respect to the lower, warm air conduit, tends to temporarily trap some of the warm air therein, before the same finds its way into the warm air conduit. While so trapped, the air is more or less agitated and deflected, by the inclined back wall of the mouth part, so that at least some of it re-engages the hot radiator and is thereby heated to a desirably high temperature before being conducted into the vehicle body. When the shutters 6 are closed, the source of air is the interior of the vehicle body, the air being drawn by the fan from the body through the upper conduit, outwardly through the radiator, through the passageway between the front of the radiator and shutters, and thence inwardly through the radiator. If desired the source of air may be the outside atmosphere only, in which case, the upper or cold air conduit may be closed off by means of the shutter 26, the shutters 6 being then opened to the desired extent, usually only partly open so as to permit a restricted volume of air to be drawn through the radiator portion above the divider 8 and forced rearwardly through the lower conduit 22. By restricting the air volume, the upper part of the radiator is maintained at a higher temperature than is normal so that the air passing therethrough is more effectively heated.

The deflectors 25 and 26 may be independently or simultaneously operated and suitably fastened in opened or closed positions to control the passage of air into or out of the vehicle body and the device is so constructed that the hood may be opened and closed in the ordinary way and sufficient space provided between the heater pipes and the engine to permit free access to the latter. Also, the use of the heater above described does not adversely affect the efficiency of the engine cooling system, particularly in cold weather seasons when a part of the radiator is often covered to prevent over-cooling. In warm weather, when heat is not desired in the vehicle body, the shutters 6 may be opened wide so as to maintain the usual cooling function of the upper part of the radiator. When the shutters are wide open, the air blown into the conduit 22, will not, of course, be heated to as high a temperature as is the case when the shutters are closed or partially closed. Also, such air as is forced rearwardly in the conduit 22, may be permitted to escape through an opening or port 49 which is provided in the bottom of the conduit, a door 50 slidable from closed to open position in suitable guideway 51 being provided for regulating the passage of air through said port. A rod or handle 52 is provided at the rear end of the door 50 and extends rearwardly therefrom through the dash 2 so that the door may be moved to open or closed position or to any intermediate position to regulate the uncovering of the opening in the pipe. When the door is closed the hot air is forced out into the car and when open the hot air is allowed to escape into the space above the engine and into the hood, thus securing a regulation of the heating of the car.

It will thus be seen that I have provided a simple and efficient car heating unit which may be readily installed in standard automobiles in the course of manufacture, or subsequently as an additional accessory. It will also be apparent that the device may be readily applied in conjunction with the usual radiator front enclosure with air regulating shutters, all simultaneously controlled, or with the upper or lower portions independently controlled.

While I have shown and described my invention in a preferred form, I am aware that various modifications and changes may be made therein without departing from the principles of the invention, the scope of which may be determined by reference to the appended claims.

I claim as my invention:

1. The combination with an automotive vehicle including a body, a liquid cooled, internal combustion engine for propelling the vehicle, a radiator for cooling the engine cooling medium and a fan back of said radiator for drawing air therethrough to effectively cool the cooling medium circulating through the radiator, of means for supplying warm air to the interior of said body comprising a pair of conduits communicating at their rear ends with the interior of said body, one of said conduits communicating at its front end with the air passageways of said radiator and constituting an air outlet for said body, the other conduit having an enlarged mouth part at its front end, located back of an upper portion only of said radiator for receiving air which is warmed in its passage through said radiator, said mouth part being also located back of and overlapping a material part of the upper portion of the area of rotation of said fan, whereby the latter tends to force said warmed air rearwardly through said last mentioned conduit, and a front closure for the upper part of said radiator, spaced forwardly therefrom for restricting the volume of outside air which enters said upper radiator portion and forming an air passageway in front of the radiator whereby said fan is operative to draw air from said outlet conduit, through said passageway, inwardly through said radiator and to then force such air rearwardly into the vehicle body through said warm air conduit.

2. The combination with an automotive vehicle including a vehicle body, a liquid cooled internal combustion engine for propelling the vehicle, a radiator for cooling the engine cooling medium and a fan at the back of said radiator for drawing air therethrough, of means for supplying warm air to the interior of the vehicle body comprising a radiator front divided into top and bottom sections, shutter mechanism for controlling the open front of the top section of the radiator front, a conduit having its rear end in communication with the interior of the vehicle body and its front end in communication with the top portion of the back of the radiator opposite the top section of the radiator front, a second conduit leading from the back of the radiator to the interior of the vehicle body, the front end of said second conduit having an enlarged mouth in communication with the upper portion of the back of the radiator opposite the top section of the radiator front, the bottom of the enlarged mouth having an opening receiving the top of the fan, whereby air will be drawn from the vehicle body through the first mentioned conduit and through the radiator into the top section of the radiator front and thence rearwardly through the radiator and through the second mentioned conduit back to the interior of the body of the vehicle.

3. The combination with an automotive vehicle including a vehicle body, a liquid cooled internal combustion engine for propelling the vehicle, a radiator for cooling the engine cooling medium and a fan at the back of said radiator for drawing air therethrough, of means for supplying warm air to the interior of the vehicle body comprising a radiator front divided into top and bottom sections, shutter mechanism for controlling the open front of the top section of the radiator front, a conduit having its rear end in communication with the interior of the vehicle body and its front end in communication with the top portion of the back of the radiator opposite the top section of the radiator front, a second conduit leading from the back of the radiator to the interior of the vehicle body, the front end of said second conduit having an enlarged mouth in communication with the upper portion of the back of the radiator opposite the top section of the radiator front, the bottom of the enlarged mouth having an opening receiving the top of the fan, whereby air will be drawn from the vehicle body through the first mentioned conduit and through the radiator into the top section of the radiator front and then rearwardly through the radiator and through the second mentioned conduit back to the interior of the body of the vehicle, said second mentioned conduit having an intermediate discharge port, a closure for said port, and means accessible within the vehicle body for controlling said closure.

4. The combination with an automotive vehicle including a vehicle body, a liquid cooled internal combustion engine for propelling the vehicle, a radiator for cooling the engine cooling medium, an engine hood, and a fan at the back of the radiator for drawing air therethrough, of means for supplying warm air to the interior of the vehicle body comprising a conduit located between the engine and the hood and communicating at its rear end with the interior of the vehicle body and having its front end in engagement with the upper portion of the back of the radiator to directly receive air passing rearwardly through the raditor and deliver it into the vehicle body, the bottom of the front portion of the conduit having an opening in which the top portion of the fan works to force heated air directly from the radiator rearwardly through the conduit, the lower portion of the fan working in an open space below the conduit to draw air through the radiator and force said air against the engine, and a radiator front for the radiator, said front including shutter mechanism for controlling the volume of air passing through the radiator.

5. The combination with an automotive vehicle including a vehicle body, a liquid cooled internal combustion engine for propelling the vehicle, a radiator for cooling the engine cooling medium, an engine hood, and a fan at the back of the radiator for drawing air therethrough, of means for supplying warm air to the interior of the vehicle body comprising a conduit located between the engine and hood and communicating at its rear end with the interior of the vehicle body and having its front end engaging the upper portion of the back of the radiator to directly receive air passing rearwardly through the radiator and deliver it into the vehicle body, the bottom of the front portion of the conduit having an opening in which the top portion of the fan works to force heated air directly from the radiator rearwardly through the conduit, the lower portion of the fan working in an open space below the conduit to draw air through the radiator and force said air against the engine, and a radiator-front covering the portion of the radiator opposite the front end of the conduit, said radiator-front including shutter mechanism for controlling the volume of air passing through said portion of the radiator.

6. The combination with an automotive vehicle including a vehicle body, a liquid cooled internal combustion engine for propelling the vehicle, a radiator for cooling the engine cooling medium, an engine hood, and a fan at the back of the radiator for drawing air therethrough, of means for supplying warm air to the interior of the vehicle body comprising a conduit located between the engine and the hood and communicating at its rear end with the interior of the vehicle body and having its front end engaging the upper portion of the back of the radiator to directly receive air passing rearwardly through the radiator and deliver it into the vehicle body, the bottom of the front portion of the conduit having an opening in which the top portion of the fan works to force heated air directly from the radiator rearwardly through the conduit, the lower portion of the fan working in an open space below the conduit to draw air through the radiator and force said air against the engine, a radiator front on the radiator and divided by a horizontal partition into a lower section and an upper section, said upper section being opposite the front end of the conduit, and shutter mechanism for the open front of the radiator front.

7. The combination with an automotive vehicle including a vehicle body, a liquid cooled internal combustion engine for propelling the vehicle, a radiator for cooling the engine cooling medium, an engine hood, and a fan at the back of the radiator for drawing air therethrough, of means for supplying warm air to the interior of the vehicle body comprising a conduit located between the engine and the hood and communicating at its rear end with the interior of the vehicle body and having its front end engaging the upper portion of the back of the radiator to directly receive air passing rearwardly through the radiator and deliver it into the vehicle body, the bottom of the front portion of the conduit having an opening in which the top portion of the fan works to force heated air directly from the radiator rearwardly through the conduit, the lower portion of the fan working in an open space below the conduit to draw air through the radiator and force said air against the engine, a radiator front on the radiator having a horizontal partition dividing the radiator front into lower and upper sections, said upper section being opposite the front end of the conduit, and independently operable shutter mechanisms for said lower and upper sections of the radiator front.

8. The combination with an automotive vehicle including a vehicle body, a liquid cooled internal combustion engine for propelling the vehicle, a radiator for cooling the engine cooling medium, an engine hood, and a fan at the back of the radiator for drawing air therethrough, of means for supplying warm air to the interior of the vehicle body comprising a conduit located between the engine and the hood and communicating at its rear end with the interior of the vehicle body and having its front end enlarged horizontally to form an entrance mouth in direct communication with the upper portion of the back of the radiator to directly receive air passing rearwardly through the radiator and deliver it into the vehicle body, the bottom of the front portion of the conduit having an opening in which the top portion of the fan works to force heated air directly from the radiator rearwardly through the conduit, the lower portion of the fan working in an open space below the conduit to draw air through the radiator and force said air against the engine, and a radiator front for the radiator, said front including shutter mechanism for controlling the volume of air passing through the radiator.

9. The combination with an automotive vehicle including a vehicle body, a liquid cooled internal combustion engine for propelling the vehicle, a radiator for cooling the engine cooling medium, an engine hood, and a fan at the back of the radiator for drawing air therethrough, of means for supplying warm air to the interior of the vehicle body comprising a conduit located between the engine and the hood and communicating at its rear end with the interior of the vehicle body and having its front end back of and in direct communication with a normally hot portion of the radiator to directly receive air passing rearwardly through the radiator and deliver it into the vehicle body, the bottom of the front portion of the conduit having an opening in which the top portion of the fan works to force heated air directly from the radiator rearwardly through the conduit, the lower portion of the fan working in an open space below the conduit to draw air through the radiator and force said air against the engine, and means associated with the radiator for causing the engine-cooling-medium in the radiator to attain a temperature sufficiently high to heat the air passing through the radiator and into the heater conduit.

10. The combination with an automotive vehicle including a vehicle body, a liquid-cooled internal combustion engine for propelling the vehicle, a radiator for cooling the engine-cooling medium, an engine hood, and a fan at the back of the radiator for drawing air therethrough, of means for supplying warm air to the interior of the vehicle body comprising a conduit located between the engine and the hood and communicating at its rear end with the interior of the vehicle body and having its front end enlarged to form an entrance mouth, said mouth being disposed with its front edge closely adjacent the back of a normally hot portion of the radiator so as to be in direct communication therewith to directly receive air passing rearwardly through the radiator and deliver it into the vehicle body, the enlarged mouth serving to hold a part of the air received thereby in heat-absorbing proximity to the radiator, the bottom of said mouth part having an opening in which the top portion of the fan works to force heated air rearwardly through the conduit, the lower portion of the fan working in an open space below the conduit to draw air through the radiator and force said air against the engine, and means associated with the radiator for restricting the volume of air passing through the radiator to cause the engine-cooling medium to attain an efficient engine-operating temperature whereby the radiator will be effective to materially heat the air passing through the radiator and into said entrance mouth and conduit.

11. A heating system for motor-driven vehicles including an engine cooling system having an inter-communicating jacket and radiator for a circulating cooling medium, said radiator having air passageways therethrough, comprising a conduit leading from the vehicle body and communicating with said air passageways, a conduit leading from said air passageways to the vehicle body, said conduits and air passageways constituting a channel separated from said cooling medium jacket, and means for withdrawing air from the vehicle body and forcing the withdrawn air through said channel and to the interior of the vehicle body.

12. A heating system for motor-driven vehicles including an engine cooling system having an inter-communicating jacket and radiator for a circulating cooling medium, said radiator having air passageways therethrough, comprising casing members secured to the inner and outer surfaces of said radiator and co-operating with said air passageways to provide an air heating chamber, a conduit leading from the interior of the vehicle body and communicating with said air heating chamber, a conduit leading from said air heating chamber and opening to the interior of said vehicle body, and means for withdrawing air from the vehicle body interior and forcing said withdrawn air through said air heating chamber and to the interior of said vehicle body.

EDWARD G. MIHALIAK.